United States Patent [19]

Lautzenhiser et al.

[11] Patent Number: 4,960,287

[45] Date of Patent: Oct. 2, 1990

[54] QUICK-RELEASE MOUNT FOR BATTERIES

[76] Inventors: John L. Lautzenhiser, 726 Main Street East, Hamilton, Ontario, Canada, L8M 1K9; Gary A. Lautzenhiser, 5920 County Rd. 4, Hamilton, Ind. 46742

[21] Appl. No.: 263,159

[22] Filed: Oct. 27, 1988

[51] Int. Cl.[5] .................... B62B 9/12

[52] U.S. Cl. .................... 280/304.1; 180/65.1; 180/907; 280/250.1; 403/290; 403/377

[58] Field of Search .................... 280/250.1, 304.1; 180/907, 65.1, 68.1; 403/377, 297, 290; 297/DIG. 4

[56] References Cited

U.S. PATENT DOCUMENTS

| | | | |
|---|---|---|---|
| 2,993,550 | 7/1961 | Klappert | 180/907 |
| 4,140,192 | 2/1979 | Sharpe | 180/68.5 |
| 4,386,672 | 6/1983 | Coker | 180/907 |
| 4,708,297 | 11/1987 | Boers | 403/377 |

*Primary Examiner*—Charles A. Marmor
*Assistant Examiner*—Eric Culbreth
*Attorney, Agent, or Firm*—Wendell E. Miller

[57] ABSTRACT

Apparatus and method are provided for rapidly attaching and rapidly removing a battern (24) from a conveyance (10) of the type having a foldable frame (14) with side-members (26) that are foldably interconnected by cross-brace arms (28). A first quick-release element (38) is attached to the pivot pin (36) that interconnects the cross-brace arms (28); and a second quick-release element (40) is connected to the battery (24) by a U-shaped strap (84).

32 Claims, 3 Drawing Sheets

QUICK-RELEASE MOUNT FOR BATTERIES

THE DESCRIPTION

1. Technical Field

The present invention relates to mounting batteries into vehicles or conveyances that are propelled by electric motors. More particularly, the present invention relates to apparatus and method for mounting a battery under the seat of a wheelchair of the type in which side-members are folded together for loading the wheelchair into an automobile.

2. Background Art

Wheelchairs provide an increased degree of mobility and independence for handicapped people, allowing many to perform work or services that increase the per capita production of their country of residence, as well as helping them to feel that they are useful individuals.

Generally, manually-propelled wheelchairs have been relatively light-weight vehicles, have included two side members that are spaced-apart by pivoted cross-arms, and have been foldable for easy transport in an automobile.

Electrically-propelled wheelchairs provide a greater degree of mobility and independence for handicapped persons. However, since the speed and operating range of electrically-propelled wheelchairs is quite limited, it is of great importance that electrically-propelled wheelchairs be easily transportable by automobile.

An electrically-propelled wheelchair that is easily transportable by automobile will include the characteristics of being light-weight and foldable. Recently, much work has been done to provide battery-powered electric drive units which are efficient, which are light-weight, and which do not interfere with folding the side members into juxtaposed positions.

Typically, electrically-propelled wheelchairs are put into the trunk of an automobile for transporting, lying on one of the folded frame members. Since the battery is generally of the lead-acid type, it must be removed from the wheelchair so that it can be transported in an upright position.

Further, since the side members are folded into juxtaposed positions for transporting by automobile, the batteries must be removed to allow the side members to be folded into their juxtaposed positions.

Thus, in order to be easily transportable, the battery must be easily and quickly removable and replaceable. Further, any battery-attaching mechanism that is permanently attached to the wheelchair must not interfere with folding the side members into their juxtaposed positions.

DISCLOSURE OF INVENTION

The present invention provides apparatus and method for quickly attaching a battery to an electrically-propelled wheelchair of the type having a foldable structure which includes side members that are spaced-apart by foldable cross-arms.

In the preferred embodiment, a first quick-release element, that is cylindrical in shape, is horizontally and longitudinally disposed, and is cantilever-attached to the cross-arms, or to the pivot pin interconnecting the cross-arms.

A second quick-release element is tubular in shape, is slidable over the first quick-release element, and is releasably retained on the first quick-release element by a plurality of retaining projections that extend radially outward from the first quick-release element.

The retaining projections are formed by providing an enlarged retaining portion on the first quick-release element and forming a plurality of rotationally-positioned longitudinal slots that divide the enlarged retaining portion into the plurality of retaining projections.

The first quick-release element further includes a plurality of release cams that are juxtaposed against the retaining projections and that are formed, in part, by the aforementioned longitudinal slots.

A manual-release element includes a recess that presses the release cams radially inward in response to manually pressing the manual-release element longitudinally toward the release cams.

A battery-attaching device includes a U-shaped bracket having a bottom portion which receives a battery, a pair of upstanding side-walls that extend upwardly beside and above the battery, a pair of holes in the side-walls that receive the second quick-release element, a pair of resilient grommets that removably secure the second quick-release element in the holes, and a bolt that is inserted through smaller holes in the side-walls and that presses the side-walls against the sides of the battery.

According to a first aspect of the invention, apparatus is provided for mechanically attaching a battery to a structure, which apparatus comprises a first quick-release element being operatively attached to the structure, and a second quick-release element that is functionally associated with the battery, for attachingly engaging the first quick-release element.

According to a second aspect of the invention, apparatus is provided for mechanically attaching a battery to a foldable conveyance of the type having first and second cross-brace arms that each include upper and lower ends and that are foldably interconnected intermediate of said ends by a pivot pin, which apparatus comprises a first quick-release element being operatively attached to the conveyance, and a second quick-release element that is functionally associated with the battery, for attachingly engaging the first quick-release element.

According to a third aspect of the invention, a method is provided for supportively attaching a battery to a structure, which method comprises operatively attaching a first quick-release element to the structure, providing a battery-associated quick-release element, and supportively engaging the battery-associated quick-release element with the first quick-release element.

According to a fourth aspect of the invention, a battery-powered conveyance is provided which comprises a foldable frame having side members that are foldably interconnected by first and second cross-brace arms, first and second propulsion elements that are operatively attached to respective ones of the side members, a battery with a center of gravity, an electric motor that is operatively connected to the battery and to one of the propulsion elements, and means for removably attaching the battery to the conveyance, for allowing the battery to swing about a point that is above the center of gravity, and for allowing the conveyance to be folded when the battery is removed.

According to a fifth aspect of the invention, a quick-release device is provided which comprises a first element having two retaining projections and release cams that are juxtaposed against the retaining projections, a second element that attachingly engages the attaching portion and retainingly engages the retaining projections, a release element that engages the release cams and that deflects both the release cams and the retaining projections radially inwardly in response to movement of the release element longitudinally against the release cams, and means for securing the release element in close proximity to said release cams.

According to a sixth aspect of the invention, a battery-attaching device is provided which comprises a U-shaped support strap having a bottom portion, having upstanding side-wall portions, and having openings in the side-wall portions that are equidistant from the bottom portion; a support tube being disposed through both of the openings; and means for retaining the support tube in the openings.

BEST MODE FOR CARRYING OUT THE INVENTION

Figure 2:
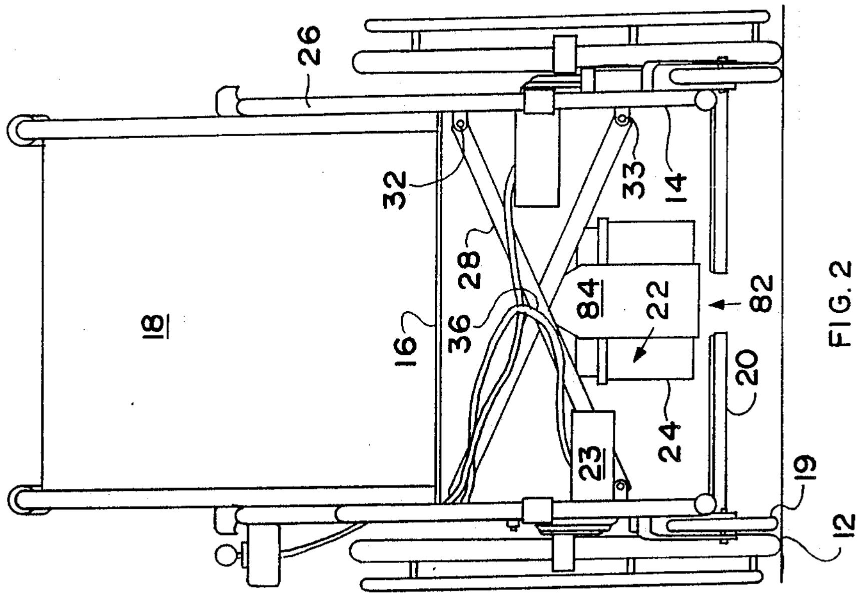
FIG. 2 is a front elevation of the electric wheelchair of FIG. 1, taken substantially as shown by view line 2—2 of FIG. 1.
Figure 1:
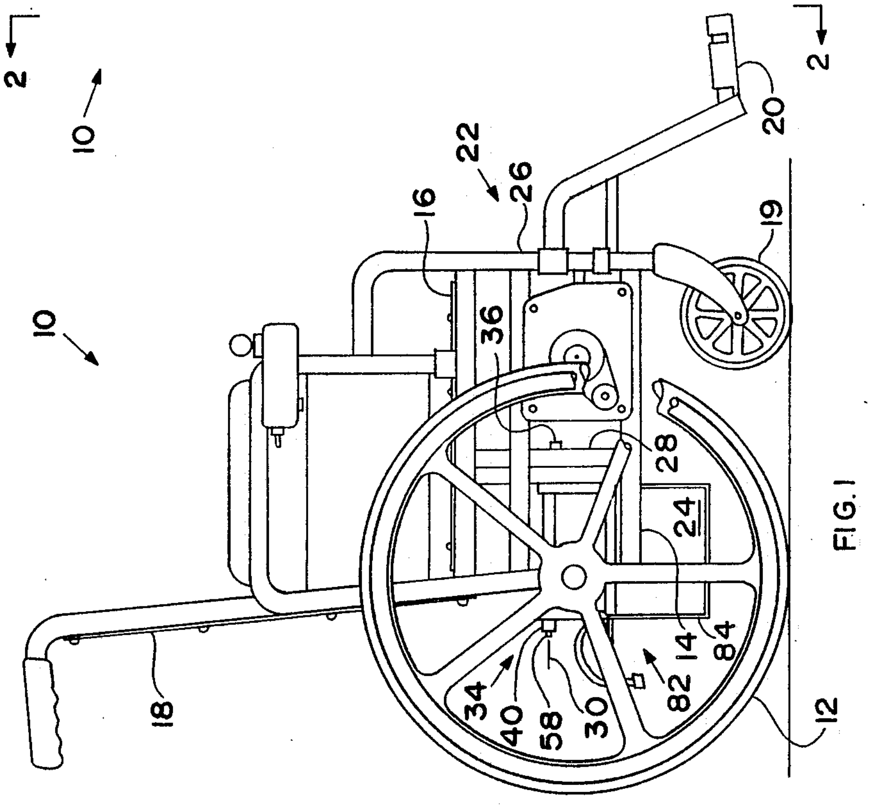
FIG. 1 is a side elevation of a conventional wheelchair to which an electric motor drive and the quick-release battery mount of the present invention have been added.

Referring now to FIGS. 1 and 2, a foldable or collapsible battery-powered conveyance, or electric wheelchair, 10 includes two wheels, or propulsion elements, 12, a foldable structure or foldable frame 14, a seat bottom 16, a seat back 18, two castor wheels 19, two footrests 20, two drive units 22 each having an electric motor 23, and a battery 24.

The foldable structure, or foldable frame, 14 includes two side members 26 that are spaced apart by two cross-brace arms 28. The cross-brace arms 28 are pivotally and foldably attached to each other at a pivot axis, or longitudinal axis, or point, 30 intermediate of an upper end 32 and a lower end 33 of respective ones of the cross-brace arms 28, so that the foldable frame 14 may be folded with the side members 26 juxtaposed together, not shown, but typical of foldable wheelchairs.

Referring now to FIGS. 1–5, the present invention provides apparatus for mechanically attaching the battery 24 to a conventional electric wheelchair as described in conjunction with FIGS. 1 and 2.

A mechanical-attaching apparatus, or quick-release battery mount 34 is attached to the cross-brace arms 28 by a bolt, or pivot pin, 36. As clearly seen in FIG. 4, the quick-release battery mount 34 is not only disposed closer to the pivot axis 30 than to either the upper ends 32 or the lower ends 33 of the cross-brace arms 28, but also the quick-release mount 34 is attached to the frame 14 concentric with the pivot axis 30.

Since the bolt 36 serves both as a pivot pin for the cross-brace arms 28 and a bolt for attaching the quick-release battery mount 34, the quick-release battery mount 34 is not only attached to the pivot pin 36, but also is attached to the cross-brace arms 28.

Figure 5:
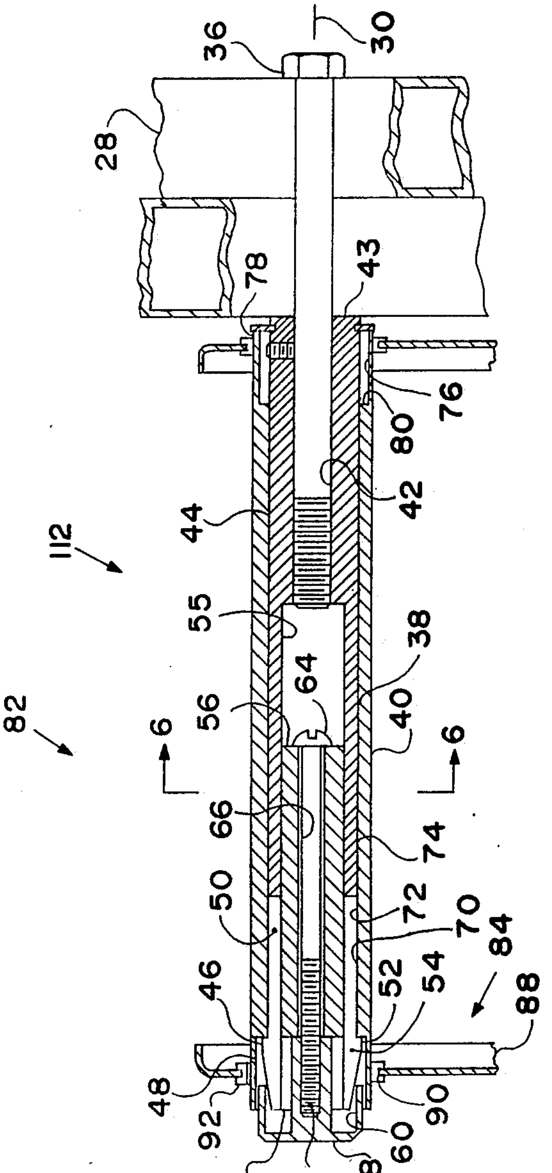
FIG. 5 is an additionally enlarged view of a portion of the cross-arms of the wheelchair, and an additionally-enlarged cross-section of the quick-release mechanism of the present invention, taken substantially the same as in FIGS. 1 and 3, and showing only a portion of the U-shaped battery strap.
Figure 6:
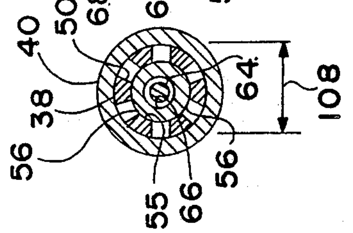
FIG. 6 is a cross-sectional view of the quick-release mechanism of FIG. 5, taken substantially as shown by section line 6—6.

Referring now to FIGS. 5 and 6, the quick-release battery mount 34 includes a first quick-release element, or support element, 38 that is generally cylindrically-shaped, and a second quick-release element, or a battery-support element, 40 that is tubularly-shaped. The first quick-release element 38 and the second quick-release element 40 are both slidably and telescopically engaged.

As seen in FIG. 5, both of the elements 38 and 40 are disposed horizontally and longitudinally along the pivot axis 30, and are concentric with the pivot axis 30.

The first quick-release element 38 includes a threaded hole 42 in a cantilever-attached first end 43 which receives the bolt 36; so that the bolt 36 permanently attaches the first quick-release element 38 to the wheelchair 10.

The first quick-release element 38 includes an attaching portion 44 that is cylindrically-shaped, an enlarged retaining portion, or securing portion, 46 of increased effective diameter that is cylindrically-shaped and that is juxtaposed against the attaching portion 44, a cam-release portion 48 that is juxtaposed against the enlarged retaining portion 46, and longitudinal slots 50 that divide the enlarged retaining portion 46 into a plurality of retaining projections, 52, that divide the cam-release portion 48 into a plurality of release cams 54, and that extend longitudinally into the attaching portion 44 to reduce the camming force that is required to resiliently deflect the release cams 54 radially inwardly.

The first quick-release element 38 includes a cylindrically-shaped opening 55 into which is pressed a support rod, or support tube, 56. The support tube 56 provides additional strength for the attaching portion 44 to replace the strength lost by the slots 50.

The quick-release battery mount 34 further includes a manual-release element 58 with a cam-release opening 60 and a threaded screw-hole 62. A threaded fastener, or round-head machine screw, 64 extends through a hole 66 in the support tube 56 and threadingly engages the threaded screw-hole 62, thereby holding the cam-release opening 60 of the manual-release element 58 in close proximity to a second end 68 of the first quick-release element 38, and in close proximity to the release cams 54.

As can be seen by considering FIG. 5, manually pressing the manual-release element 58 toward the cantilever-attached first end 43, and into contact with the release cams 54 is effective to deflect both the release cams 54 and the retaining projections 52 radially inwardly.

The second quick-release element 40 includes an inner cylindrically-shaped surface 70 whose periphery, or surface, 72 is in general proximity and/or contact with a periphery, or surface, 74 of the first quick-release element 38. The second quick-release element 40 also includes two counterbores 76 that are proximal to respective ones of two ends 78 of the element 40.

Each of the counterbores 76 includes a transverse surface, 80. Depending upon which of the ends 78 of the second quick-release element 40 is proximal to the retaining projections 52, one of the transverse surfaces 80 retainingly engages the retaining projections 52.

Thus, it can be seen that the retaining projections 52 cooperate with one of the transverse surfaces 80 to provide means for automatically securing the second quick-release element 40 on the first quick-release element 38, and that the manual-release element 58 cooperates with the release cams 54 to provide means for rendering the retaining projections 52 ineffective in securing the elements, 38 and 40, in engagement, thereby manually releasing the second quick-release element 40. Thus, the aforesaid combination provides means for releasably securing elements 38 and 40, and for preventing accidental disengagement of the elements 38 and 40.

Figure 4:
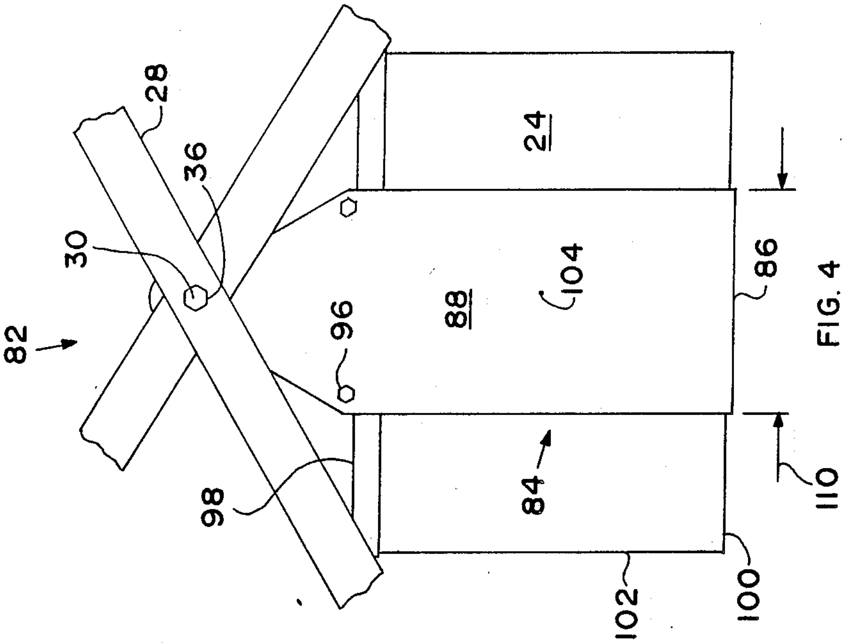
FIG. 4 is an end view of FIG. 3, taken substantially as shown by view line 4—4 of FIG. 3.
Figure 3:
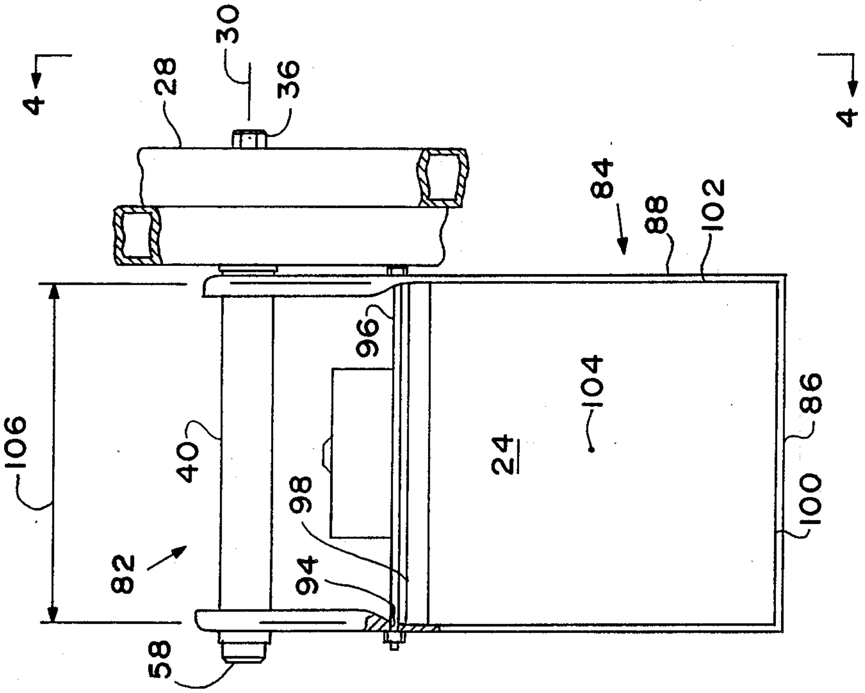
FIG. 3 is a partial and enlarged portion of the cross-arms of the wheelchair of FIGS. 1 and 2, an enlarged side elevation of the quick-release battery mount of the present invention, and an enlarged side elevation of the battery, taken substantially the same as FIG. 1.

Referring now to FIGS. 3–5, the second quick-release element 40 is functionally associated with the battery 24. In the preferred embodiment, this function association comprises a battery-attaching device 82 which includes the second quick-release element 40.

More specifically, the battery-attaching device 82 includes a U-shaped support strap, or battery-attaching bracket, 84 having a bottom portion 86, a pair of upstanding side-wall portions 88, two support-tube openings 90 that are disposed in respective ones of the side-wall portions 88 and are equidistant from the bottom portion 86, the second quick-release element 40 which is disposed through the openings 90, two resilient rubber grommets 92 that resiliently secure the second quick-release element 40 in the openings 90, and clamp-bolt holes, or smaller openings, 94 that are disposed in respective ones of the side-wall portions 88, and that receive a clamp bolt 96 which presses the side-wall portions 88 inwardly against the battery 24.

Referring now to FIGS. 3 and 4, the battery 24 includes a top 98, a bottom 100, side-walls 102, and a center of gravity 104. It can be seen that the battery-attaching device 82 supports the battery 24 along an axis, the longitudinal axis 30, that is above the center of gravity 104 of the battery 24, and including a location 106 that is intermediate of the side-walls 102 of the battery 24.

As seen in FIG. 3, the second quick-release element 40 makes an ideal carrying handle for carrying the battery 24.

As clearly seen in FIG. 5, the retaining projections 52 project orthogonally outward from the attaching portion 44 of the first quick-release element 38.

The battery-attaching device 82, which includes the second quick-release element 40 and the battery-attaching bracket 84, serves as a battery-attaching means, or mechanical-attaching means.

As seen in FIG. 6, the first quick-release element 38 has a first width 108 which is narrower than a second width 110 of the battery-attaching device 82, which is shown in FIG. 4.

Finally, the present invention provides a quick-release device 112 which includes the first quick-release element 38, the second quick-release element 40, and the manual-release element 58.

While specific apparatus and parameters have been disclosed in the preceding description, and while numbers of specific parts that have been described in the specification have been included in the claims, it should be understood that these specifics have been given for the purpose of disclosing the principles of the present invention and that many variations thereof will become apparent to those who are versed in the art. Therefore, the scope of the present invention is to be determined by the appended claims and the recitations thereof.

INDUSTRIAL APPLICABILITY

The present invention is applicable to structures or conveyances in which a battery is mounted, and in which rapid attachment, removal, and replacement of the battery is desirable.

NUMBER LIST

10 foldable or collapsible battery-powdered conveyance, or electric wheelchair
12 wheels or propulsion elements
14 foldable structure, or foldable frame
16 seat bottom
18 seat back
19 castor wheels
20 footrests
22 drive units
23 electric motor
24 battery
26 side members
28 cross-brace arms
30 pivot axis, or longitudinal axis, or point (above center of gravity 104 and above top 98)
32 upper ends
33 lower ends
34 mechanical-attaching apparatus, or quick-release battery mount
36 bolt, or pivot pin
38 first quick-release element, or support element
40 second quick-release element, or battery-support element
42 threaded hole
43 cantilever-attached first end
44 attaching portion
46 enlarged retaining portion, or securing portion
48 cam-release portion
50 longitudinal slots
52 plurality of retaining projections
54 release cams
55 cylindrically-shaped opening
56 support rod, or support tube
58 manual-release element
60 cam-release opening
62 threaded screw-hole
64 threaded fastener, or round-head machine screw
66 hole
68 second end
70 inner cylindrically-shaped surface
72 periphery (of element 40), or surface
74 periphery (of element 38), or surface
76 counterbores
78 ends (of element 40)
80 transverse surfaces
82 battery-attaching device (includes 40, 84, and 92)
84 U-shaped support strap, or battery-attaching bracket
86 bottom portion (of support strap 84)
88 upstanding side-wall portions
90 support-tube openings (in side-wall portions 88)
92 resilient rubber grommets
94 clamp-bolt holes, or smaller openings
96 clamp bolt
98 top (of battery 24)
100 bottom (of battery 24)
102 side-walls (of battery 24)
104 center of gravity (of battery 24)
106 location (on axis 30 and between sides of battery)

108 first width (of 38)
110 second width (of 82)
112 quick-release device

What is claimed is:

1. Apparatus (34) for mechanically attaching a battery (24) to a foldable conveyance (10) having first and second cross-brace arms (28) that each include an upper (32) and a lower (33) end and that are foldably interconnected intermediate of said ends by a pivot pin (36), which apparatus comprises:
a first quick-release element (38) having a first end (43) that is operatively attached to said cross-brace arms intermediate of said ends thereof, and having a longitudinal axis (30) that extends generally orthogonally outward from said cross-brace arms; and
attaching means (82), comprising a second quick-release element (40) that detachably engages said first quick-release element, and that is operatively attached to said battery, for supporting said battery underneath said first quick-release element;
said quick-release elements being the sole connection between said foldable conveyance and said apparatus.

2. Apparatus (34) as claimed in claim 1 in which said apparatus comprises means (52+54+58) for releasably securing said second quick-release element (40) to said first quick-release element (38).

3. Apparatus (34) as claimed in claim 1 in which said apparatus comprises means (52+80) for automatically securing said second quick-release element (40) to said first quick-release element (38).

4. Apparatus (34) as claimed in claim 1 in which
said engagement of said quick-release elements comprises sliding engagement.

5. Apparatus (34) as claimed in claim 1 in which one (38) of said quick-release elements comprises a tubularly-shaped element;
the other (40) of said elements comprises a cylindrically-shaped element;
said engagement of said elements comprises telescopic engagement of said elements; and
said apparatus includes means, comprising a projection (52) that extends orthogonally outward from said cylindrically-shaped element, for releasably securing said elements from said telescopic engagement.

6. Apparatus (34) as claimed in claim 1 in which one (38) of said quick-release elements comprises a cylindrically-shaped element;
the other (40) of said elements comprises a tubularly-shaped element;
said engagement of said elements comprises telescopic engagement of said cylindrically-shaped element and said tubularly-shaped element;
said apparatus includes means, comprising a projection (52) that extends orthogonally outward from said cylindrically-shaped element, for securing said elements in said engagement; and
said apparatus includes means, comprising a manual-release element (58), for selectively rendering said projection generally ineffective in said securing.

7. Apparatus (34) as claimed in claim 1 in which one (40) of said quick-release elements comprises a tubularly-shaped element (40);
the other (38) of said quick-release elements comprises a cylindrically-shaped element (38);
said engagement of said elements comprises telescopic engagement of said elements;
said apparatus includes means, comprising said cylindrically-shaped element having a securing portion (46) that extends radially outward from said cylindrically-shaped element, for securing said elements in said engagement; and
said apparatus includes means, comprising a manual-release element (58), for rendering said securing portion generally ineffective in said securing of said elements in said engagement.

8. Apparatus (34) as claimed in claim 1 in which said apparatus comprises means (52+80) for preventing accidental disengagement of said quick-release elements (38 and 40).

9. Apparatus (34) as claimed in claim 1 in which said first quick-release element (38) has a first width (108);
said attaching means has a second width (110); and
said first width is smaller than said second width.

10. Apparatus (34) as claimed in claim 1 in which said battery (24) is free to pivot about said first quick-release element (38).

11. Apparatus (34) as claimed in claim 1 in which said attaching means comprises a battery-attaching bracket (84); and
said operative attachment of said attaching means (82) to said battery (24) comprises said second quick-release element being attached to said battery by said bracket.

12. Apparatus (34) as claimed in claim 1 in which said first quick-release element (38) is disposed generally parallel to said pivot pin (36).

13. Apparatus (34) as claimed in claim 1 in which said operative attachment of said first element (38) to said cross-brace arms (28) comprises operatively attaching said first element to one of said cross-brace arms (28) generally concentric with said pivot pin (36).

14. Apparatus (34) as claimed in claim 1 in which
said second quick-release element (40) serves as a carrying handle for said battery.

15. Apparatus (34) as claimed in claim 1 in which one (38) of said quick-release elements comprises a tubularly-shaped element (40); and
said detachable engagement of said elements comprises telescopic engagement of said elements.

16. A quick-release device (112) which comprises:
a first element (38) having an attaching portion (44) that is disposed generally along a longitudinal axis (30), having an enlarged retaining portion (46) that is juxtaposed against said attaching portion, having a cam-release portion (48) that is juxtaposed against said enlarged retaining-portion, and having a longitudinal slot (50) that divides said cam-release portion into two release cams (54), that divides said enlarged retaining-portion into two retaining projections (52), and that extends into said attaching portion thereby reducing the camming force that is necessary to deflect said retaining projections toward said longitudinal axis;
second element means (40), having a surface (72) that attachingly engages said attaching portion, and having a transverse surface (80) that retainingly engages said retaining projections;
release means comprising a release element (58) which has an opening (60) that operatively engages said release cams, for deflecting said retaining projections inwardly toward said longitudinal axis in response to movement of said release element longitudinally against said release cams; and means (64) for securing said release element in close proximity to said release cams.

17. A quick-release device (112) as claimed in claim 16 in which said second element means (40) engages a majority of the periphery (74) of said first element (38).

18. A quick-release device (112) as claimed in claim 16 in which said second element means (40) is tubular.

19. A quick-release device (112) as claimed in claim 16 in which said first element (38) is generally cylindrical; and said second element means (40) encloses a majority of the periphery (74) of said first element (38).

20. A quick-release device (112) as claimed in claim 16 in which said second element means (40) is generally tubular;

said release element (58) is small enough to pass through said second element means; and said securing means comprises a threaded fastener (64) that is generally concentric with said longitudinal axis (30).

21. A quick-release device (112) as claimed in claim 16 in which said second element means (40) is generally tubular;

said release element (58) is small enough to pass through said second element means;

said securing means comprises a threaded fastener (64) that is insertable through said first element (38) distally from said release means; and said first element includes a second longitudinal slot (50) that is rotationally displaced from the first said slot, and that sub-divides both of said retaining projections (52) and both of said release cams (54).

22. A quick-release device (112) as claimed in claim 21 in which said first element (38) is generally cylindrical;

said first element includes a cylindrically-shaped opening (55) in said attaching portion (44) that opens through said cam-release portion (48) of said first element;

said device includes support-rod means (56), being disposed in said cylindrically-shaped opening, for strengthening said attaching portion wherein said slots (50) extend; and said threaded fastener extends through said support-rod means.

23. A battery-attaching device (82) which comprises:

a U-shaped support strap (84) having a bottom portion (86), having two upstanding side-wall portions (88), and having an opening (90) in each of said side-wall portions that are equidistant from said bottom portion;

a tube (56) being disposed through both of said openings;

means, comprising a resilient grommet (92) being disposed in each of said openings, and resiliently engaging said tube at spaced-apart locations, for retaining said tube in a said openings;

a smaller opening (94) in each of said side-wall portions (88) being disposed intermediate of the first said openings (90) and said bottom portion (86); and threaded fastener means (64), for extending through said smaller openings, and for pressing said side-wall portions inwardly.

24. Apparatus (34) for mechanically attaching a battery (24) to a foldable conveyance (10) having first and second cross-brace arms (28) that each include an upper (32) and a lower (33) end and that are foldably interconnected intermediate of said ends by a pivot pin (36), which apparatus comprises:

a first quick-release element (38) having a first end (43) that is operatively secured to said cross-brace arms intermediate of said ends thereof, and having a longitudinal axis (30) that extends generally orthogonally outward from said cross-brace arms; and attaching means (82), comprising a second quick-release element (40) that slidably engages said first quick-release element, and that is operatively attached to said battery, for supporting said battery underneath said first quick-release element;

said cross-brace arms being the sole support for said battery.

25. Apparatus (34) as claimed in claim 24 in which one (38) of said quick-release elements comprises a tubularly-shaped element (40);

said slidable engagement of said elements comprises telescopic engagment of said elements; and said apparatus includes means, being operatively attached to one of said elements, for releasably securing said elements from said telescopic engagement.

26. Apparatus (34) as claimed in claim 24 in which said apparatus comprises means (52+80 and 54+58) for automatically securing said second quick-release element (40) to said first quick-release element (38) and for manually releasing said second quick-release element from said first quick-release element.

27. Apparatus (34) as claimed in claim 24 in which said second quick-release element comprises a tubularly-shaped element (40);

said first quick-release element comprises a cylindrically-shaped element (38); and said engagement of said elements comprises telescopic engagement of said elements.

28. Apparatus (34) as claimed in claim 24 in which said first quick-release element (38) is disposed generally horizontally.

29. Apparatus (34) as claimed in claim 24 in which said operative securing of said first quick-release element to said cross-brace arms comprises cantilever attachment.

30. Apparatus (34) as claimed in claim 24 in which said battery is free to pivot about said longitudinal axis (30) of said first quick-release element.

31. Apparatus (34) as claimed in claim 24 in which said securing of said first quick-release element (38) to said cross-brace arms (28) comprises operatively attaching said first quick-release element to said pivot pin.

32. Apparatus (34) as claimed in claim 24 in which said securing of said first quick-release element (38) to said cross-brace arms (28) comprises attaching said first quick-release element to said conveyance at a location that is closer to said pivot pin (36) than to any of said ends (32, 33).

* * * * *